June 1, 1943.  J. A. LOVE  2,320,624
DISK HARROW
Filed July 7, 1941  2 Sheets-Sheet 1
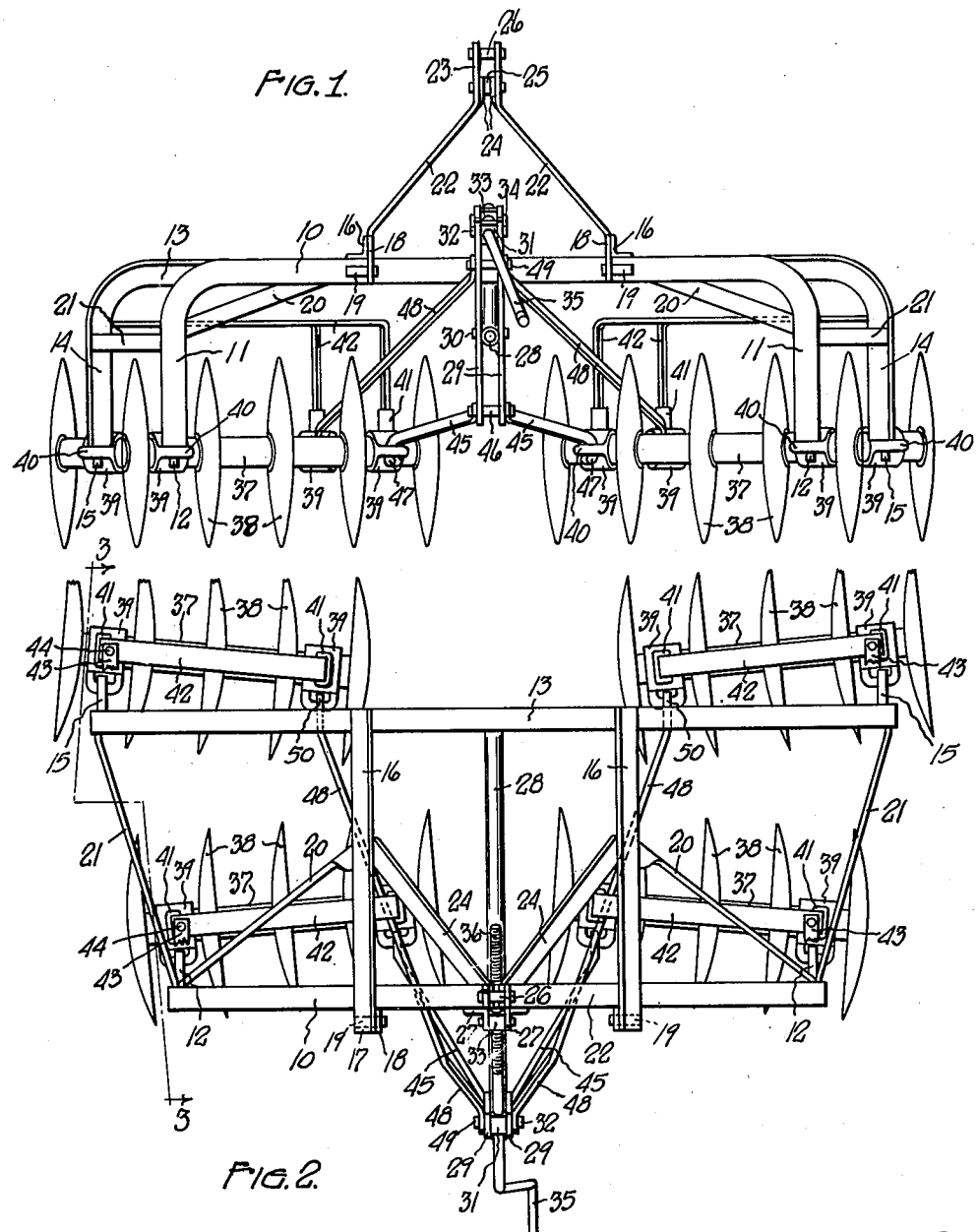
INVENTOR.
JABEZ A. LOVE,
BY Oltsch & Knoblock
Attorneys.

June 1, 1943.  J. A. LOVE  2,320,624
DISK HARROW
Filed July 7, 1941   2 Sheets-Sheet 2
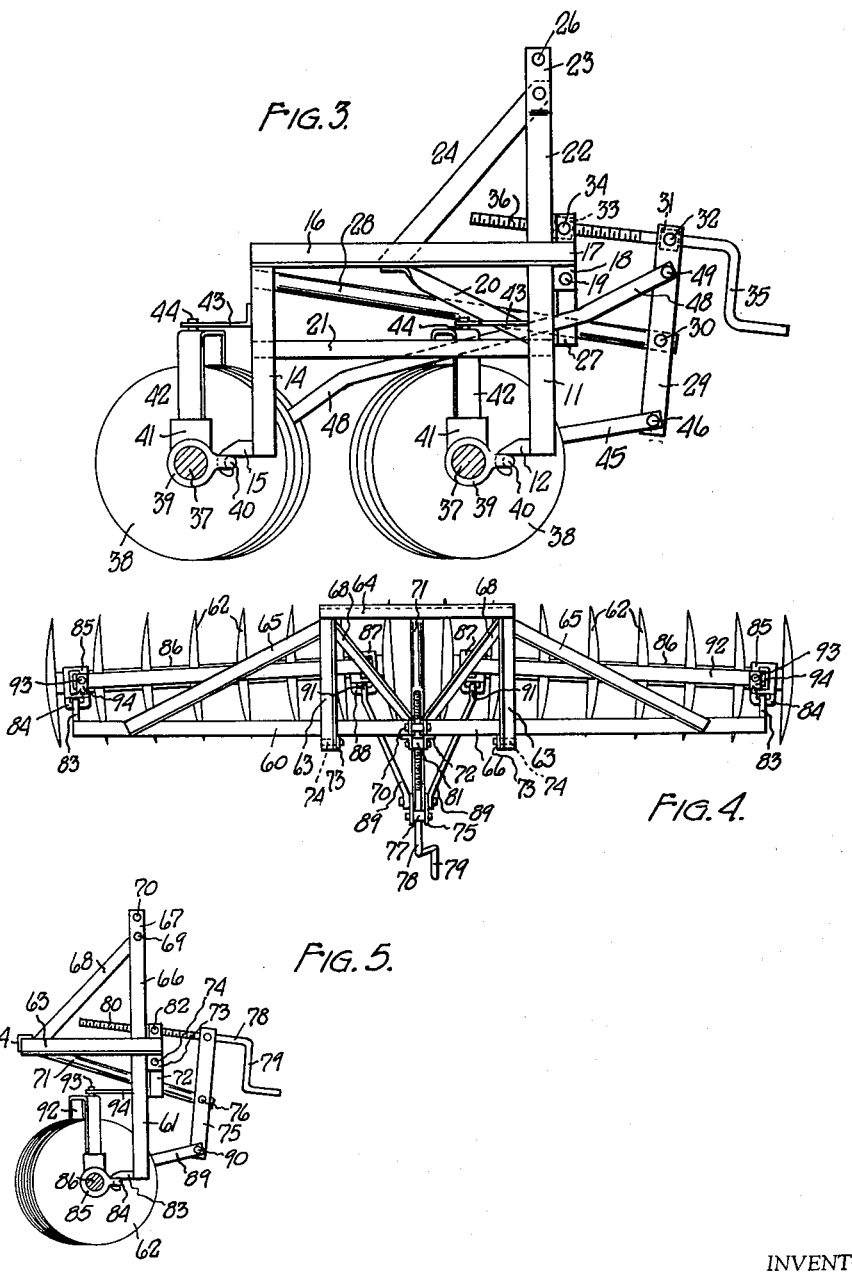
INVENTOR.
JABEZ A. LOVE
BY Oltsch & Knoblock
Attorneys.

Patented June 1, 1943

2,320,624

UNITED STATES PATENT OFFICE 2,320,624

DISK HARROW

Jabez A. Love, Eau Claire, Mich.

Application July 7, 1941, Serial No. 401,317

18 Claims. (Cl. 55—83)

This invention relates to improvements in disk harrows.

So called unit mounting systems have been developed for the connection of various agricultural implements to a tractor in a manner to control the setting of the implement without requiring undue weight of the implement and also to permit the implement to be carried in an elevated position. Unit mountings of this type have additional advantages with respect to the simplicity and ease of attachment or connection of an implement to a tractor and also permit a great saving of time in connecting and disconnecting implements from the tractor. The unit mounting usually comprises a pair of tension or pulling arms adapted for connection with the implement in transversely spaced substantially aligned points and a positioning bar connected with the implement at a point above the point of connection of the tension bars which serves to substantially prevent the implement from tilting when the same is being passed through ground much harder or heavier than the major portion of the ground which is being worked thereby.

While the unit mounting aforesaid offers substantial advantages as above mentioned, one of its principal disadvantages is that up to this time only a limited number of implements have been designed and perfected which may be connected with such a unit mounting.

It is the primary object of this invention to provide a disk harrow adapted to be connected to a tractor by a unit mounting.

A further object is to provide a disk harrow having at least three points of connection with a tractor of which at least two constitute draft points and the remainder are positioning points above the draft points.

A further object is to provide a disk harrow having disk gangs arranged in tandem and provided with means for simultaneously adjusting the position of all gangs.

A further object is to provide a disk harrow with a rigid frame having an adjustable part with which each disk gang of a tandem harrow is connected and from which each gang is pulled.

A further object is to provide a tandem disk harrow which is longitudinally compact to reduce the lever effect thereof upon a tractor and to effect an effective and uniform cut.

A further object is to provide a tandem harrow having a rigid frame and adapted for connection with a tractor at least at 3 points spaced transversely and vertically whereby the front and rear gangs will effect a cut of the same depth.

A further object is to provide a disk harrow which can be quickly and easily attached and detached from a tractor.

A further object is to provide a disk harrow of reduced weight which is inexpensive and simple in construction and operation.

Other objects will be apparent from the drawings, description, and appended claims.

In the drawings:

Fig. 1 is a view of a tandem harrow embodying my invention shown in front elevation.

Fig. 2 is a top plan view of a tandem harrow.

Fig. 3 is a side elevation of a tandem harrow with parts shown in section taken on line 3—3 of Fig. 2.

Fig. 4 is a top plan view of a single unit harrow.

Fig. 5 is a side elevation of the single unit harrow similar to Fig. 3.

Referring to the drawings, and particularly to Figs. 1 to 3 which illustrate the preferred embodiment of a tandem harrow, the numeral 10 designates a front transverse frame member preferably formed of rigid angle iron and bent in a U-shape to provide legs 11 extending downwardly at opposite ends of the frame member. The lower ends of legs 11 fixedly carry rearwardly projecting hook members 12. The rear transverse frame member 13 also formed of angle iron and bent in inverted U-shape to provide downwardly extending legs 14 has hook members 15 rigidly secured thereto and extending rearwardly therefrom. Frame 13 is preferably longer than frame 10 and the two frames are positioned in spaced parallel relation with the legs 11 and 14 thereof extending vertically.

A pair of spaced longitudinally extending angle irons 16 are fixedly secured to the frame members 10 and 13 in parallel relation and equi-spaced from the center of said frame members. The front ends of angle iron 16 project beyond the front frame member 10 at 17 and each thereof has a vertical plate 18 welded or otherwise fixedly secured thereto in depending relation. Each of the plates 18 has fixedly connected thereto in outwardly extending relation a connector pin 19. Diagonal braces 20 are fixedly secured to intermediate portion of the angle iron 16 intermediate their ends and extend forwardly and outwardly therefrom for fixed connection with intermediate portions of the vertical legs 11 of the front frame 10. Reinforcing bars 21 are secured at their opposite ends to intermediate portions of adjacent vertical legs 11 and 14. It will thus be seen that by means of the angle iron 16 and braces 20 and 21 a rigid frame unit is provided wherein the front and rear transverse frame members 10 are held in rigid predetermined relation to each other at all times.

A pair of bars 22 are secured to the front portions of the angle irons 16 and extend upwardly and inwardly therefrom to terminate in spaced parallel upper portions 23. Reinforcing bars 24 are rigidly secured to intermediate portions of the angle irons 16 and extend forwardly, upwardly, and inwardly therefrom for connection with the upper end portion 23. A spacer block 25 is interposed between the upper end portions 23 of bars 22 to hold said portions in properly spaced relation. A connector pin 26 is secured between the ends of the bar portions 23. The connector pin 26 together with the two connector pins 19 constitute connector elements adapted for connection with a unit type of draft mounting such as that utilized in the "Ford-Ferguson" system.

A pair of spaced vertical angle irons 27 are rigidly secured to the front frame member 10 at the center thereof as by welding and extend in spaced relation therebelow. Elongated metal tube 28 is welded or otherwise fixedly secured at the center of the rear transverse frame member 13 and extends forwardly and downwardly therefrom and passes between the angle irons 27 to which it is fixedly secured as by welding. The forward end of tube 28 extends in fixedly spaced relation to the angle irons 27 and to the frame 13. Thus, this tube 28 serves as attachment means to reinforce and brace the rigid frame unit described above. The outer end of the tube 28 pivotally mounts a pair of spaced parallel bars 29 at an intermediate point 30 thereof. The upper ends of bars 30 mount a bearing block 31 therebetween pivoted to bars 29 at 32. The angle irons 27 project above the upper end of transverse frame and a block 33 provided with an internally screw threaded bore is pivoted at 34 between the upper ends of angle irons 27. A crank 35 having elongated screw threaded portion 36 is journaled in the bearing block 31 in a manner to prevent longitudinal movement thereof relative to said bearing block and the threaded portion 36 thereof is threaded in the pivoted block 33. It will thus be seen that the bars 29 are positioned forwardly of the rigid frame unit and the inclination thereof relative to the vertical is readily adjusted by the crank 35.

A plurality of disk gang units each comprising an elongated shaft 37 mounting disk blade 38 thereon in equi-spaced relation are connected in tandem to the frame unit. Between the outermost disk 38 at each end of the shaft 37 is journaled a suitable bearing 39. Each of these bearings 39 is provided with a forwardly projecting eyelet 40 and each thereof also mounts an upwardly projecting socket 41. The outer bearing 39 of each disk gang has its eyelet 40 interlocked with a hook 12 of the frame members 10 and 13 whereby the disk gangs are arranged in conventional tandem relation with the hooked engagement at 12—40 constituting a pivot connection of each disk gang with the rigid frame unit. A rigid inverted U-shaped bar 42 is associated with each disk gang and has the ends of its vertical leg portions mounted in the sockets 41 of the inner and outer bearings 39 of each disk gang.

A rigid horizontal rearwardly extending arm 43 is preferably secured to each of the vertical legs 11 and 14 of the transverse frame members to extend adjacent the outer end of each of the frame members 42 and is pivoted to the adjacent frame member 42 at 44 to constitute a connection between the rigid frame unit and the inverted U-shaped member 42.

A pair of rearwardly extending links 45 are projected at their forward ends at 46 on opposite sides of the bars 29. The links 45 terminate in hook portions 47 which fit in the eyelets 40 of the inner bearings 39 of each of the forward disk gangs. Elongated links 48 are pivotally connected to side bars 29 at 49 at their forward ends and in substantially equi-spaced and opposed relation to pivot 46 of links 45 with respect to pivot center 30 of said bars 29. The bars 48 are shaped to extend through the positioning frames 42 of the front disk gangs and above the disk plates 38 thereof. The rear ends of bars 48 terminate in hook portions 50 which fit in the eyelets 40 of the inner bearings 39 of each of the rear disk gangs. It will thus be seen that the inner ends of each of the disk gangs of the tandem disk harrow are connected with and pulled from the bars 29 to provide a uniform or common point of connection for all of the disk gangs. Additionally, it will be obvious that this connection of links 45 and 48 with pivoted bars 29 permits simultaneous and substantially equal adjustment of the angular position of each disk gang relative to the rigid frame unit.

Referring now to the construction of the single unit type of harrow illustrated in Figs. 4 and 5, the construction thereof is as follows:

A transverse inverted U-shaped angle iron frame member 60 having vertically depending leg portions 61 is formed of a length substantially greater than the length of the transverse frame member of the tandem disk and according to the number of the disk units 62 to be mounted upon each of the two disk gangs. A pair of parallel horizontal angle iron members 63 are welded to the frame member 60 in transverse relation thereto. The rear ends of angle irons 63 are interconnected by a short transverse angle iron member 64. Diagonal braces 65 extend between the rear ends of the longitudinal frame member 63 and the outer ends of the transverse frame member 60. A pair of upwardly projecting bars 66 are provided which are welded to the frame members 63 adjacent the forward ends thereof and which extend upwardly and inwardly therefrom to terminate in a vertical portion 67. Braces 68 are welded at their lower ends to the rear ends of frame member 63 and are fixedly secured to the portions 67 at 69. A connector pin 70 is carried by the upper end portion 67, and an elongated tubular member 71 is welded at its rear end to the cross member 64 at its center and extends forwardly and downwardly therefrom. A pair of angle bars 72 are welded to the frame 60 and project downwardly therefrom and intermediate portion of tubular member 71 is welded to the bars 72. Thus, it will be seen that each of the members 60, 63, 64, 65, 66, 68, 71, and 72 are so interconnected as to form a rigid effectively braced frame unit.

A vertical plate 73 is welded to the front of each frame member 63 adjacent the frame member 60 and each of the plates 73 carries a connector pin 74 which pins are arranged in horizontal arrangement and cooperate with pin 70 to serve as a three point draft connection for the implement with a tractor.

The forward end of tube 71 has a pair of upright rigid bars 75 pivoted at an intermediate point 76 thereto. At their upper ends the bars 75 mount a bearing block 77 to journal the shaft 78 of a crank 79. The shaft 78 is elongated and includes a screw threaded portion 80 which has threaded connection with a block 81 pivoted between the upper ends of plate 73 at 82.

The lower ends of the legs 61 of the transverse frame member 60 carries rigid rearwardly projecting hook members 83 which are adapted for hooked connection with eyelets 84 carried by bearings 85 and mounted at the outer ends of shaft 86 which carries the disks 62. Bearings 87 are mounted adjacent the inner end of each shaft and include eyelets 88 projecting forwardly therefrom.

A pair of links 89 are pivoted at 90 at their forward ends to the lower ends of bars 75. The rear ends of links 89 terminate in hook portions 91 fitting in the eyelets 88 of the inner bearings 87. Each of the disk gangs may include an inverted U-shaped positioning frame portion 92 suitably carried by the bearings 85 and 87 and pivoted at 93 adjacent their outer ends to arms 94 carried by the ends of the transverse frame unit 60.

It will be noted that in the use of the device whether the tandem or the single unit form, the same may be connected to a unit mounting such as the Ford-Ferguson unit by simply attaching suitable connecting parts of said unit to the connector elements 19 and 26 of the tandem form or to elements 70—74 of the unit form. Thereupon, the device is ready for operation with the pull exerted upon the lower connector elements such as 19 or 74 and a positioning or rearwardly pulling action being exerted upon the upper connector elements 26 or 70.

It will also be observed that when the unit type of mounting is to be operated for the purpose of elevating the implement above the ground by raising the arms of the units connected to the lower connecting elements and by pulling upon the upper arms of the unit connected at the upper connector elements, this disk harrow in either embodiment will move upwardly to an elevated position. The close coupling of the disk in a tandem unit and the close positioning of the disk gangs to the points of connection 70, 74 with the unit mounting reduces the effective weight and leverage of the units and permits the same to be elevated without danger of overbalancing the tractor about its rear wheels.

One of the important advantages of this construction resides in the fact that the draft upon the inner ends of the gang unit both in the single and in the tandem forms is effected with a single rigid member, that is, the member 29 in the tandem form and the member 75 in the unit form; hence, by merely operating one adjusting member such as the crank 35 of the tandem form, simultaneous adjustment of the relative angular position of the disk gangs is achieved.

Still a further advantage of the construction is fact that the compactness thereof and its simplicity reduces the weight and consequently the cost thereof affords a substantial advantage in this respect over present disk harrows adapted to be drawn by a tractor.

While the harrow has been primarily designed for use with a unit mounting of the Ford-Ferguson type and the greatest advantages of the construction are achieved when used with that type of mounting, it will be understood that the device may also be used with equal facility when attached to any conventional draw bar construction carried by a tractor.

I claim:

1. A disk harrow adapted to be connected to a tractor at three or more points of which at least one is above the others, comprising a rigid frame including a pair of spaced transverse inverted U-shaped rigid frame members and a plurality of spaced rigid longitudinal frame members extending between and fixedly secured to said first frame members, a pair of aligned connector elements secured to the front of said frame, a rigid upwardly projecting member fixedly secured to said frame at the front thereof, a connector element carried by said last-named member at its upper end, a plurality of disk gangs each including a shaft, a bearing journaled adjacent the outer end of each shaft and including an eyelet, a rigid hook fixedly carried by each end of each transverse frame member and each fitting in one of said eyelets, a member carried by one of said longitudinal frame members in forwardly spaced relation to the front transverse frame member, and a plurality of links, each of said links connecting the inner end of the shaft of a disk gang with said last named member.

2. A disk harrow adapted to be connected to a tractor at three or more points spaced transversely and vertically, comprising a rigid frame unit including fixedly interconnected rigid transverse, longitudinal and upright members, a plurality of disk gangs each including a shaft mounting a bearing adjacent each end, means connecting the outer bearing of each gang with the outer end of a transverse frame member, one of said longitudinal frame members projecting forwardly of said frame intermediate the sides thereof, link members connecting the inner bearing of each gang with the forward end of said forwardly projecting longitudinal frame member, and at least three spaced connector elements carried by said frame including at least one carried by the upper end of said upright frame portion and above the other elements.

3. A disk harrow adapted to be connected to a tractor at three or more points spaced vertically and transversely, comprising a rigid frame unit including fixedly interconnected rigid transverse and longitudinal members, a plurality of disk gangs each including a disk shaft mounting a bearing adjacent each end, means pivotally connecting the outer bearing of each gang with the outer end of a transverse frame member, one of said longitudinal frame members projecting forwardly of said frame intermediate the sides thereof, a rigid member adjustably mounted on the front end of said projecting frame member, a plurality of links connecting the inner bearings of said disk gangs with said adjustable member, and at least three connector elements secured to said frame unit at the front thereof and arranged in vertically and transversely spaced relation.

4. A disk harrow adapted to be connected to a tractor at three or more points spaced vertically and transversely, comprising a rigid frame unit including fixedly interconnected rigid transverse and longitudinal members, a plurality of disk gangs each including a disk shaft mounting a bearing adjacent each end, means pivotally connecting the outer bearing of each gang with the outer end of a transverse frame member, one of said longitudinal frame members projecting forwardly of said frame intermediate the sides thereof, a rigid member pivoted intermediate its ends to the forward end of said projecting frame member about a transverse horizontal axis, means for adjusting said pivoted member including a threaded shaft connecting one end of said member with the front portion of said frame unit, a plurality of links connecting the inner bearings of said disc gangs with said pivoted member at points spaced from the pivot thereof, and at least three connector elements secured to said frame unit at the front thereof and arranged in vertically and transversely spaced relation.

5. A disk harrow adapted to be connected to a tractor at three or more points spaced vertically and transversely, comprising a rigid frame unit including fixedly interconnected rigid transverse and longitudinal members, a plurality of disk gangs each including a disk shaft mounting a bearing adjacent each end, means pivotally connecting the outer bearing of each gang with the other end of a transverse frame member, one of said longitudinal frame members projecting forwardly of said frame intermediate the sides thereof, a rigid member adjustably mounted on the front end of said projecting frame member, a plurality of links connecting the inner bearings of said disk gangs with said adjustable member, and at least three spaced connector elements secured to said frame unit at the front thereof, said frame unit including a rigid upwardly projecting portion fixedly secured to said first named frame members and mounting at least one connector element at its upper end and above the other connector elements.

6. A disk harrow adapted to be connected to a tractor at three or more points spaced vertically and transversely, comprising a rigid frame unit including fixedly interconnected rigid transverse and longitudinal members, a plurality of disk gangs each including a disk shaft mounting a bearing adjacent each end, means pivotally connecting the outer bearing of each gang with the outer end of a transverse frame member, one of said longitudinal frame members projecting forwardly of said frame intermediate the sides thereof, a rigid member adjustably mounted on the front end of said projecting frame member, a plurality of links connecting the inner bearings of said disk gangs with said adjustable member, at least three rigid angularly disposed upwardly inclined rigid frame members fixedly secured to said first named frame members at the lower ends and fixedly interconnected at their upper ends, a plurality of spaced connector elements secured to said frame unit, and a connector element secured to the upper ends of said upwardly extending frame members above said first connector elements.

7. A disk harrow adapted to be connected to a tractor at a plurality of spaced points, comprising a rigid frame unit including fixedly interconnected rigid transverse and longitudinal members, a plurality of disk gangs each including a disk shaft, means pivotally connecting the outer end of each shaft with the outer end of a transverse frame member, a plurality of links connecting the inner end of each shaft with a common rigid element of said frame unit, and at least three connector elements secured to said frame unit at the front thereof and arranged in vertically and transversely spaced relation.

8. A disk harrow comprising a rigid frame unit including substantially parallel front and rear rigid transverse frame members and rigid members rigidly connecting said front and rear members, a plurality of disk units each including a rigid sub-frame and a disk gang journaled therein, said sub-frame having a substantially upright portion, means pivotally connecting the outer end of each disk unit to said frame unit at vertically spaced points of said upright portion, a plurality of links connecting the inner end of each disk unit with a common rigid element of said frame unit, and at least three connectors fixedly secured to the front of said frame unit at vertically and horizontally spaced points.

9. A disk harrow comprising a rigid frame unit, a plurality of disk gangs arranged in tandem, means pivotally connecting the outer end of each gang with said frame unit, a rigid adjustable member carried by said frame unit, and a plurality of rigid links connecting the inner end of each gang with said adjustable member, and at least three connector elements secured to the front of said frame unit in vertically and transversely spaced relation.

10. A disk harrow comprising a rigid frame unit, a plurality of disk gangs, means for pivotally securing each gang to said rigid frame unit, means carried by said frame unit for adjusting the relative angular positions of said gangs, and at least three connector elements fixedly carried by said frame unit at the front thereof and arranged in vertically and transversely spaced relation.

11. A disk harrow comprising a rigid frame unit including fixedly interconnected rigid transverse and longitudinal members, a plurality of disk units each including a sub-frame and a disk gang journaled therein, means pivotally connecting the outer end of each disk unit with the outer end of a transverse frame member about a vertical axis, means limiting vertical tilting of said disk units, one of said longitudinal frame members projecting forwardly of said frame intermediate the sides thereof, link members connecting the inner end of each disk unit with the forward end of said forwardly projecting longitudinal frame member and at least three connectors fixedly secured to the front of said frame unit at transversely and vertically spaced points.

12. A disk harrow comprising a rigid frame unit including fixedly interconnected rigid transverse and longitudinal members, a plurality of disk units each including a disk gang and a rigid sub-frame, means pivotally connecting the outer end of each disk unit with the outer end of a transverse frame member for free horizontal swinging movement and limited vertical tilting, a plurality of links connecting the inner end of each disk unit with a common rigid element of said frame unit, and at least three connectors fixedly secured to the front of said frame unit at transversely and vertically spaced points.

13. An agricultural implement comprising spaced front and rear transverse rigid frame members, rigid longitudinal members rigidly connecting said transverse frame members, said transverse members and longitudinal members constituting a rigid frame unit, a plurality of transversely extending elongated ground working tools, rigid sub-frames each mounting one of said tools and cooperating therewith to form a tool unit, means carried by said rigid frame unit and pivotally connected to each tool unit at three vertically and horizontally spaced points, and at least three vertically and horizontally spaced connectors fixedly secured to the front of said frame unit.

14. A disk harrow comprising spaced front and rear transverse rigid frame members, rigid members fixedly connecting said transverse frame members, said transverse members and connecting members constituting a rigid frame unit, a plurality of disk gangs, each including a disk shaft, a plurality of rigid sub-frames, a pair of spaced bearings connected with each sub-frame and journaling a disk shaft, each cooperating sub-frame and disk gang forming a disk unit, means carried by said frame unit for pivotally connecting each disk unit thereto at spaced substantially vertically aligned points, links spaced from said pivot connections for connecting each disc unit with a common member of said frame unit and three vertically and horizontally spaced connectors fixedly secured to the front of said frame unit.

15. A disk harrow comprising spaced front and rear rigid transverse frame members of inverted U-shape, rigid members fixedly connecting said transverse members to form a rigid main frame unit, a plurality of rigid sub-frames of inverted U-shape pivotally connected with said main frame unit, a pair of spaced bearings carried by each sub-frame below the pivot connections of said main and sub-frames, a plurality of disk gangs each including a disk shaft journaled in said bearings, and connectors carried by said main frame and each pivotally connected to a bearing.

16. A disk harrow comprising a rigid frame unit including substantially parallel front and rear rigid transverse frame members and rigid members rigidly connecting said front and rear members, a plurality of disk units each including a sub-frame and a disk gang journaled therein, tilt-restricting means for pivotally connecting the outer end of each disk unit with the outer end of a transverse frame member about a substantially vertical axis, a rigid adjustable member carried by said frame unit, a plurality of rigid links connecting the inner end of each shaft with said adjustable member, and at least three connector elements secured to the front of said frame unit in vertically and transversely spaced relation.

17. A disk harrow comprising a rigid frame unit, a plurality of disk units arranged in tandem and each including a sub-frame journaling a disk gang, means pivotally connecting each disk unit with said frame unit in vertical-tilt-restricting relation, a rigid adjustable member carried by said frame unit, a plurality of rigid links spaced transversely from said pivot means for connecting each disk unit with said adjustable member, and at least three transversely and vertically spaced connectors fixed to said frame unit at the front thereof.

18. An agricultural implement comprising a rigid frame unit including fixedly interconnected transverse and longitudinal members, a plurality of tool units each including a rigid sub-frame and a transverse ground working tool carried by said sub-frame, means pivotally connecting the outer end of each tool unit with the outer end of a transverse frame member about a substantially vertical axis and in vertical-tilt-restricting relation, one of said longitudinal frame members projecting forwardly of said frame intermediate the sides thereof, a rigid member adjustably mounted on the front end of said projecting frame member, a plurality of links connecting the inner ends of said tool units with said adjustable member, and at least three connectors fixed on the front of said frame unit at vertically and horizontally spaced points.

JABEZ A. LOVE.